May 27, 1958  C. BIANCHI  2,836,436
COUPLING JOINED BY FLUID-PRESSURE-DEFORMED PACKING
Filed Dec. 27, 1955
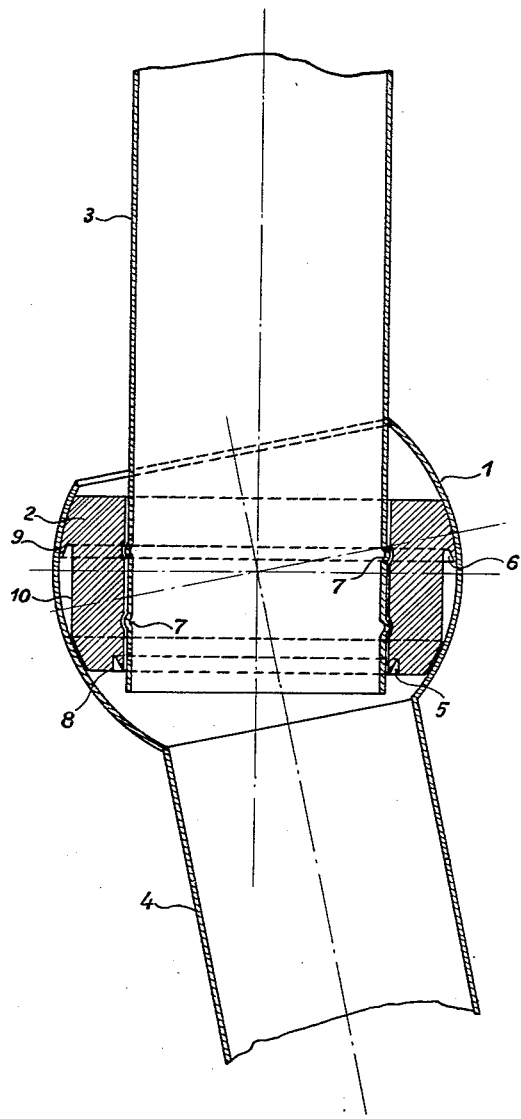

United States Patent Office 2,836,436
Patented May 27, 1958

2,836,436

COUPLING JOINED BY FLUID-PRESSURE-DEFORMED PACKING

Costanzo Bianchi, Milan, Italy, assignor to Societa r. l. A. P. I., Milan, Italy Application December 27, 1955, Serial No. 555,722

Claims priority, application Italy January 24, 1955

2 Claims. (Cl. 285—113)

The present invention relates to a rapid and self-locking ball joint.

It is one object of the present invention to provide a joint which permits of rapid and automatic coupling of pipes which are used for conveying fluid under pressure. Due to the pressure exerted by the conveyed fluid a large possibility of articulation among the succeeding pipes is created, so that the joint permits of an arrangement of the pipes just in a position, as desired. The joint finds consequently a logical use in pipings for irrigation purposes, for building yards, for all kinds of mining industries, etc.

It is another object of the present invention to provide a ball joint which consists of a spherical hollow element housing a movable, elastic ring in a spherical cavity, adhering to the sphere, and being adapted to keep the pipe conjugated or connected. The spherical coupling is already connected with a pipe, so that the introduction of the conjugated pipe fulfills the object of connecting two pipes together by forming a knee-piece due to the fact that the conjugated pipe is arranged to assume a position with varying angle relative to the other pipe.

It is still another object of the present invention to provide a ball joint in which the conjugated pipe enters into a ring, which may assure varying the plurality of positions. Upon feeding the fluid under pressure into the pipe, the encountered pressure wedges in and locks the pipe in the spherical calotte ring, presses a tight-rim upon the pipe and dilates another rim adhering to the calotte ring.

With these and other objects in view which will become apparent in the following detailed description, the present invention will be clearly understood in connection with the accompanying drawings in which the only figure shows an axial section through a joint for two pipes, which is shown in non-pressurized condition.

Referring now to the drawing, the joint comprises a coupling housing 1, in which is disposed a movable ring 2. The joint is obtained between the pipe 3 and the pipe 4. The pipe 4 is formed integrally with the coupling housing 1, and the pipe 3 engages the inside face of the ring.

The ring 2 which is of elastic material, is disposed and maintained in the coupling housing 1, whereby the pipe 3 has limited play in the housing 1. The ring 2 has a rim or border portion 5 which locks the pipe 3 and a rim 6 facing the calotte shaped housing 1. The pressure of the fluid fed into the pipes 3 and 4 acts radially in opposite directions with the rim portions 5 and 6, and in particular on the rim 5 with centripetal action, and on the rim 6 with centrifugal action. The pressing action of the fluid brings about a tight engagement between the ring 2 and the pipe 3, considering that the ring 2 is of elastic material and that it may be formed of deformable elastic material as i. e. rubber, plastics, and similar materials.

The elasticity of the ring 2 may be obtained either by constructing the same as an integral member of elastic material, or by forming instead the ring 2 of a plurality of rigid or stiff elements connected among them by means of an elastic body which allows the deformation of the entire ring. If the ring 2 consists of a sole or uniform member, rigid or stiff parts or elements, either of metal or of other suitable material may be inserted therein which are disposed entirely or partly in the member. Such elements may be arranged in the internal parts of the ring facing the pipe 3, in order to increase the rigidity of the ring 2 at the points engaging said pipe.

The securing of the pipe is obtained by means of the pressure of the fluid in the pipes developing a centripetal force on the exterior portion 10 of the ring 2, and forcing the latter to deform itself and to press itself upon the pipe 3, by surrounding the latter tightly. The hereabove mentioned stiff elements increase the safety of securing of the ring 2 to the pipe 3, particularly when between the ring 2 and the pipe 3 is found accidentally viscid matter, as mud, slime or other material, causing a considerable reduction of the friction's coefficient.

The pipe 3 also is set in a condition to cooperate with the ring 2 to its own mounting to serve the purpose aimed at. Thus it may be equipped with indentations 7, nicks, and similar means which find complementary recesses in the ring 2.

In addition to the here aforementioned radial thrusts of the fluid, the same exerts an axial thrust on the ring also, and it comes to press upon the end face 8 of the ring 2 as well as upon the surface 9 showing the tendency to push the ring axially and to wedge it between the calotte shaped housing 1 and the pipe 3, thereby increasing the pressure on the latter.

While I have disclosed one embodiment of the present invention, it is to be understood that this embodiment is given by example only and not in a limiting sense, the scope of the present invention being determined by the objects and the claims.

I claim:

1. A pipe coupling for coupling of two pipes carrying a fluid at pressures above atmospheric comprising a rapid and self-locking ball joint, a spherical socket integrally connected with the end of one of said two pipes to be coupled, and a movable, elastic ring being disposed inside said socket to receive the end of the other of said two pipes, the outer surface of said ring conforming only partly to the inner surface of said socket and a substantial portion of the outer surface of said ring being of cylindrical shape and slightly spaced apart from the inner surface of said socket and the outer face of the inner end portion of said ring being slightly apart from the inner surface of said socket, to allow the fluid pressure to exert on said outer cylindrical surface an inwardly directed thrust sufficient to anchor the end of said other of said two pipes therein, said ring having a radial inner end face and a cylindrical inner face surrounding tightly the outer surface of said other of said two pipes, the outer face of the latter having a plurality of protuberances peripherally disposed thereon opposite the said outer cylindrical surface of said ring, whereby an axial movement of said ring resulting from fluid pressure during fluid flow causes said ring to wedge between and, thereby, to lock said pipes together, and a first annular lip formation located on the outside face of said ring and engaging and sealing said ring relative to the inner surface of said socket and a second annular lip formation arranged on the inside face adjacent to said radial inner end face of said ring and engaging and sealing said ring relative to the outer face of the other of said two pipes, so that fluid-tight sealing engagement with the said socket and with said pipe end received therein is achieved.

2. The pipe coupling, as set forth in claim 1, wherein said protuberances on the outer surface of said other of said two pipes comprise at least one annular outwardly projecting indentation.

References Cited in the file of this patent

UNITED STATES PATENTS

| | | |
|---|---|---|
| 781,862 | Allen | Feb. 7, 1905 |
| 809,792 | Eustis | Jan. 9, 1906 |
| 1,500,921 | Bramson et al. | July 8, 1924 |
| 1,817,772 | Sipe | Aug. 4, 1931 |
| 2,210,833 | Clough | Aug. 6, 1940 |
| 2,289,696 | Cailloux | July 14, 1942 |
| 2,451,252 | Stoeckly | Oct. 12, 1948 |
| 2,638,362 | Sherman et al. | May 12, 1953 |

FOREIGN PATENTS

| | | |
|---|---|---|
| 455,605 | Italy | Mar. 9, 1950 |